(12) United States Patent
Rizzuto

(10) Patent No.: US 10,577,151 B2
(45) Date of Patent: Mar. 3, 2020

(54) INTERLOCKING CASE ATTACHMENT SYSTEM

(71) Applicant: Richard P. Rizzuto, Basking Ridge, NJ (US)

(72) Inventor: Richard P. Rizzuto, Basking Ridge, NJ (US)

(*) Notice: Subject to any disclaimer, the term of this patent is extended or adjusted under 35 U.S.C. 154(b) by 0 days.

(21) Appl. No.: 15/702,058

(22) Filed: Sep. 12, 2017

(65) Prior Publication Data

US 2019/0077542 A1 Mar. 14, 2019

(51) Int. Cl.
*B65D 21/02* (2006.01)
*H04B 1/3888* (2015.01)
*A45F 5/02* (2006.01)
*A45C 11/00* (2006.01)

(52) U.S. Cl.
CPC ....... *B65D 21/0201* (2013.01); *H04B 1/3888* (2013.01); *A45C 2011/002* (2013.01); *A45F 2005/025* (2013.01); *A45F 2200/0516* (2013.01)

(58) Field of Classification Search
CPC .......................... B65D 21/0201; H04B 1/3888
See application file for complete search history.

(56) References Cited

U.S. PATENT DOCUMENTS

| | | | |
|---|---|---|---|
| 5,020,673 A | 6/1991 | Adams | |
| 6,454,146 B2 | 9/2002 | Alis | |
| 8,433,377 B1 | 4/2013 | Oh et al. | |
| 9,241,051 B1* | 1/2016 | Peterson | H04M 1/0264 |
| 9,306,612 B2 | 4/2016 | Forsythe | |
| 2007/0045373 A1 | 3/2007 | Stewart, Sr. | |
| 2013/0264235 A1 | 10/2013 | Lin | |
| 2016/0165024 A1 | 6/2016 | Tan et al. | |
| 2016/0173160 A1* | 6/2016 | Gronewoller | H04B 1/3888 |
| | | | 455/575.8 |
| 2016/0226182 A1* | 8/2016 | Szeto | H01R 11/30 |
| 2016/0234356 A1* | 8/2016 | Thomas | H05K 9/0069 |
| 2017/0054466 A1* | 2/2017 | Flores | H04B 1/3888 |

FOREIGN PATENT DOCUMENTS

| | | |
|---|---|---|
| CN | 104853009 | 8/2015 |
| KR | 1020110052292 | 5/2011 |
| KR | 2020140003803 | 6/2014 |

OTHER PUBLICATIONS

Lunark Folding Smartphone image.

* cited by examiner

*Primary Examiner* — David Bilodeau
(74) *Attorney, Agent, or Firm* — Gearhart Law LLC

(57) ABSTRACT

A protective case for an electronics device containing at least a pair of protective covers for the electronics device, wherein each of the pair of protective covers comprises at least two side attachment mechanisms for attaching to another side attachment mechanism on the other of at least a pair of protective covers, and also includes a rear attachment mechanism for also attaching to the other of at least a pair of protective covers. The case can be provided as a system or as a kit or components.

8 Claims, 10 Drawing Sheets

INTERLOCKING CASE ATTACHMENT SYSTEM

CLAIM OF PRIORITY

This application is a United States non-provisional application and claims no priority to any previous patent or patent application.

FIELD OF THE EMBODIMENTS

The field of the embodiments relate to a covering for a pair of electronic devices that are able to position the electronic devices in multiple positions including but not limited to side by side, facing away from each other, back to back and standing up diagonally while keeping the pair of electronic devices attached to each other and protecting them at the same time.

BACKGROUND OF THE EMBODIMENTS

Today's electronics cases include many features for protecting expensive devices. Some allow phones to be latched on to belts or other garments. Others protective methods allow wallets or typical wallet contents to be attached to a phone. Some are designed to provide durability in hazardous environments while also allowing easy access and providing a level of privacy and style to the phone.

U.S. Pat. No. 9,306,612 pertains to a mobile electronic device holder for retaining electronic devices of various sizes and configurations in a foldable case that removably secures to a variety of surfaces. The mobile electronic device holder includes a foldable. The mobile electronic device holder further includes a variety of attachments and fasteners in order to allow the user to removably secure the foldable base to a variety of surfaces.

U.S. Patent Application 2007/0045373 pertains to a scabbard for two cell phones, wherein the scabbard has two belt loops, such that may be threaded through the loops for suspending the scabbard from the user's belt. The scabbard includes two separate compartments with top flaps extended from the main back portion used to secure the two/dual cell phone in their respective compartment, thereby precluding against inadvertent dislodgment of the phones from the scabbard. This attachment mechanics requires that the phones be on a belt, and doesn't allow for other configurations.

Some people have two cell phones one for work and one for personal use. With all of the electronics being present in people's lives there is a clear need in the art for an improvement to existing electronic device holders, specifically regarding the positioning and arrangements of the devices. In this regard the instant invention and its embodiments substantially fulfills these needs. None of the art described above addresses all of the issues described herein. The present application allows for a user to use and connect two cases while also having access to them and being able to translate the cases in relation to each other.

SUMMARY OF THE EMBODIMENTS

The current invention includes mechanisms attached to the backs and/or sides of case for phones, tablets, PDAs, and other similar electronics that allow cases to be attached to each other in multiple positions, including side by side, back to back in alignment, and rotated relative to each other.

In one embodiment of the present invention there is a protective case for an electronics device having a pair of protective covers configured to enclose the electronic device, each of the pair of protective covers having a front, a back, a first side, a second side, a top and a bottom; a first rib at a meeting between the front and the first side of each of the pair of protective covers; a second rib at a meeting between the front and the second side of each of the pair of protective covers; a third rib at a meeting between the back and the first side of each of the pair of protective covers; and a fourth rib at a meeting between the back and another of the two sides of each of the pair of protective covers; wherein each of the pair of protective covers comprises at least two side attachment mechanisms configured to attach to another side attachment mechanism on the other of the pair of protective covers.

In another embodiment of the present invention there is a protective case kit having at least a pair of protective covers; at least a pair of side attachment mechanisms configured to connect each of the pair of protective covers; and at least a pair of rear attachment mechanisms configured to connect each of the pair of protective covers.

It is another object of the present invention for the two parts of the case structure to attach to each other using magnets, a hook and loop material, a snap and fit fastener, or other similar materials, with the attachments mechanism disposed on the sides or along the long corner of each of the two parts. The hook and loop material can be removable from the protective structure r be integrated into it.

It is yet another object of the present invention to provide a protective kit containing at least a pair of protective covers, at least a pair of side or back attachment mechanisms for connecting each of the pair of protective covers.

It is yet another benefit of device to enable users to easily notice if one device is missing or left behind. If they had them attached previously (e.g.—if you go to a restaurant and put your business phone on one side of the table and your personal on the other, then get up and leave one behind by accident you would essentially realize it thanks to FlipClip . . . )? These and other features, aspects and advantages of the present invention will become better understood with reference to the following drawings, description and claims.

DESCRIPTION OF THE PREFERRED EMBODIMENTS

Figure 1:
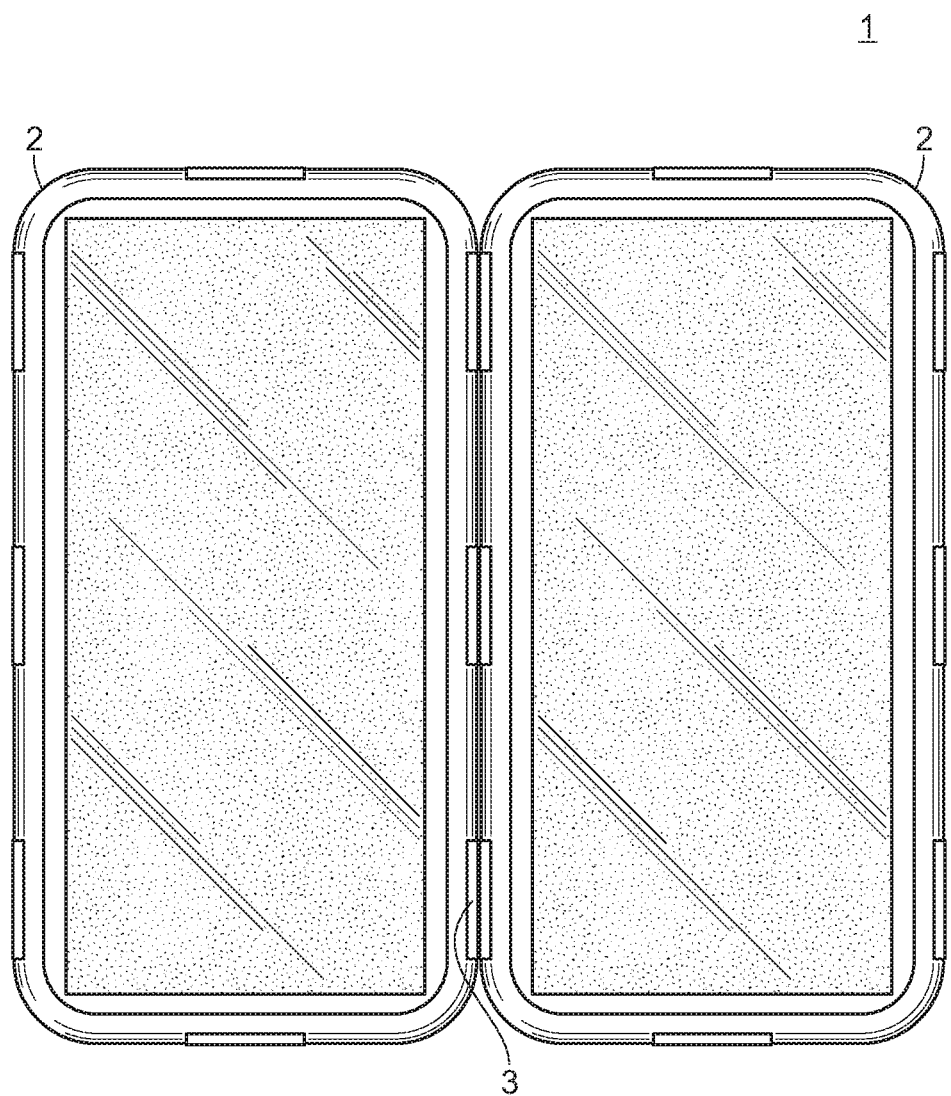
FIG. 1 shows a top perspective view of an embodiment of the invention with the electronic devices side by side in an attached position.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 7:
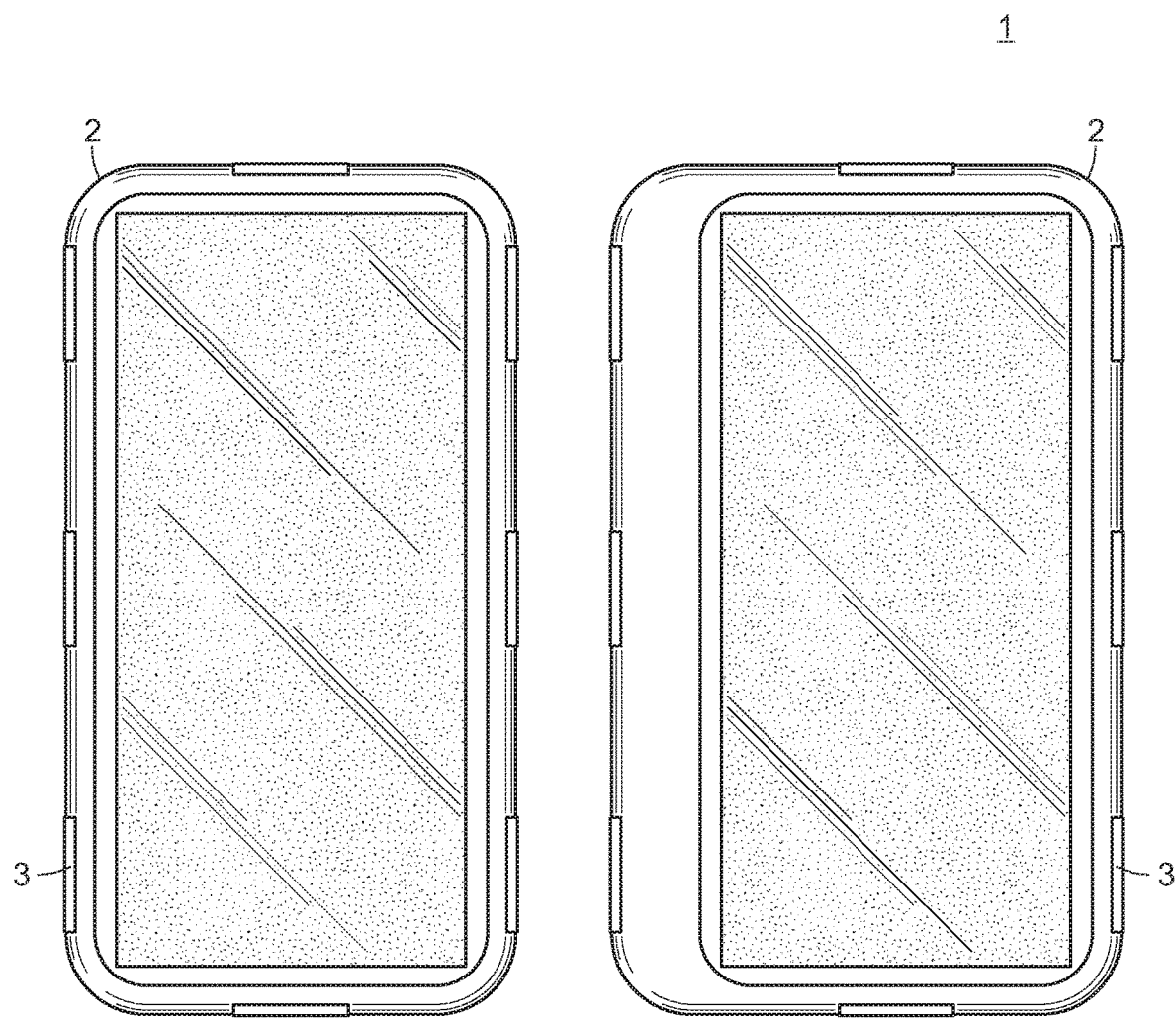
FIG. 7 shows the case assembly with different sized protective covers for different size devices.

FIG. 1 displays a case assembly 1 for a cellphone, tablet or similar electronic device that can house at least two separate electronic devices. The devices don't have to be the same shape or size, as displayed in FIG. 7. The case assembly 1 can include two distinct portions or protective covers 2. Each protective cover 2 can be used separately from the other portion or in conjunction. Each protective cover 2 can act as a protective covering for each electronic device. Each portion can hold the electronic device while allowing for access and use of the ports, slots, microphones, loudspeakers, cameras, and screens by the user when the screens are side by side or when the screens are back to back.

FIG. 1 further shows the two protective covers 2 attached by side attachment mechanisms 3. It is possible to attach more than 2, 3, or 4 devices together forming a long string, this is useful for certain applications that have content that is easier to view in vertical or horizontal format. It would be beneficial for the content of each of the screen to be interactive with each other, so that lengthy lists and certain artistic presentations would make it easier to display. It's also possible to attach two devices together and stand up them diagonally across from each other. One benefit is that games that include screen sharing, information sharing or require a larger screen can be utilized in any number of configurations. Users will be able to play games with the screens attached, not sliding apart, so that only one screen can be seen by each user.

Figure 2:
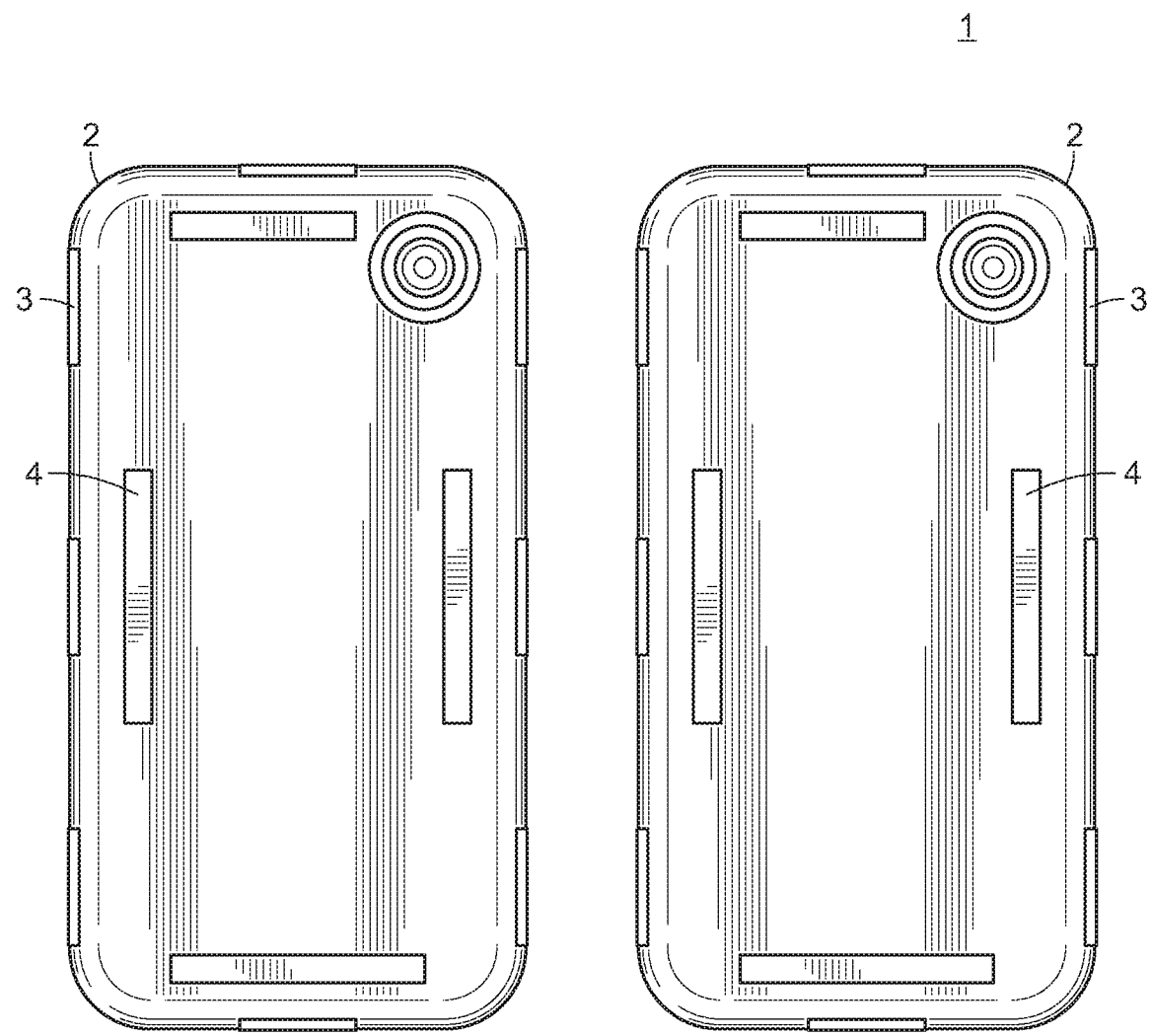
FIG. 2 shows an embodiment of the inventions with the electronic devices side by side in a separated position.

FIG. 2 shows the case assembly 1 with the two portions of the case assembly not attached by the side attachment mechanisms 3. This is useful so that when users need only one of the electronic devices, the two protective covers 2 are easily detachable and can be carried away separately.

The side attachment mechanisms 3 can make use of any number of attaching means, including a hook and loop system, tape, magnets or a hinge. As the portions of the case are brought in contact with each other the two protective covers 2 attach and are held in place by their sides and require a force to pull them apart. Tools should not be required to pull the protective covers apart, and should be a manual procedure. The attachment mechanisms 3 can be placed on the lengthwise corners, the top and bottom, or along the entire width of each side of each assembly portion. This is beneficial because the two portions can be attached to each other with either portion being on the left or right and don't need careful calibration in order to have the edges line up.

Figure 3:
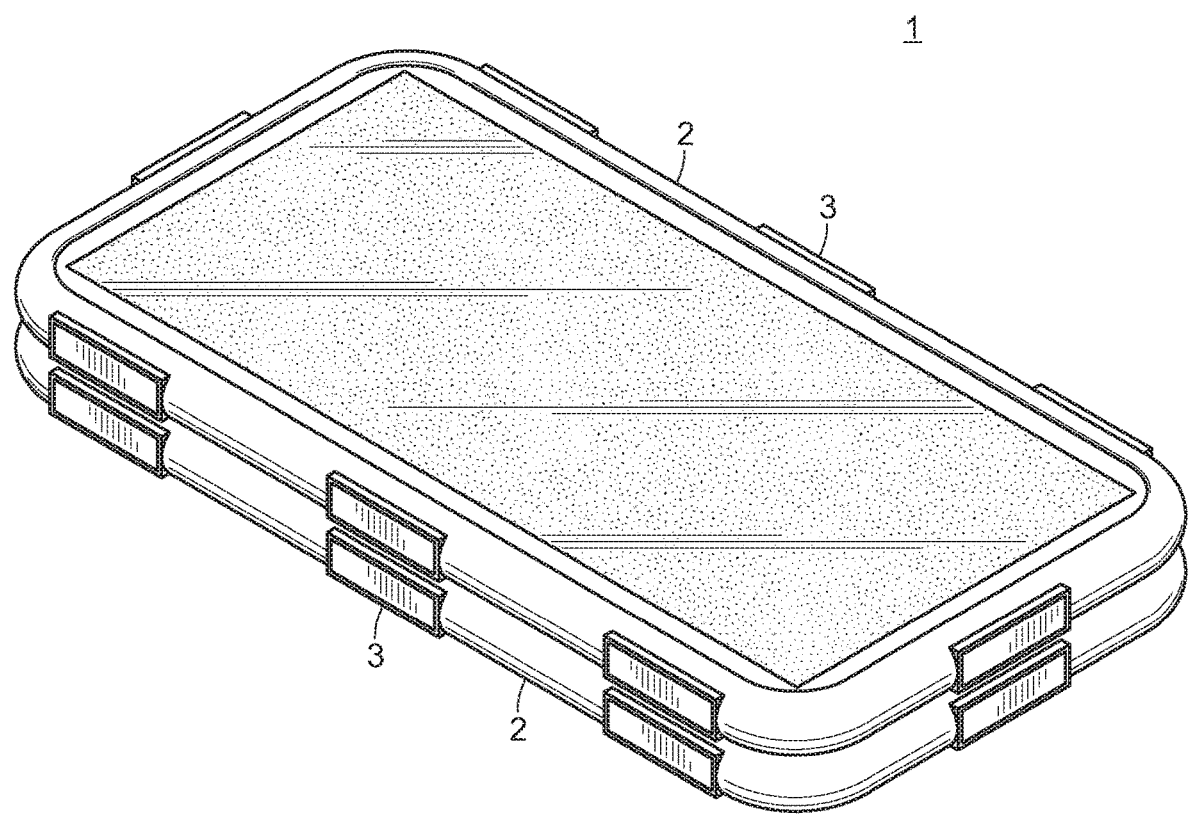
FIG. 3 shows the invention with the electronic devices back to back.

FIG. 3 shows the case assembly 1 with the electronic devices facing back to back, attached by mechanisms (shown in FIG. 2) on the back of the assembly portions. The back attachments mechanisms can be the same or different as the attachment means on the sides of the assembly portions, and can also include a hook and loop system, tape, snap fitting, a twist and lock system or magnets. All of the attachment systems should be easy to connect, and relatively easy to separate manually and not require any tools. The snap fitting can be that of a button coming together, a ball being inserted into a socket, or a male and female tabs that twist to fit together.

The attachment mechanism 3 on the sides of the protective covers 2 can also be acting when then the assembly portions are facing back to back. The rear attachment mechanisms 4 can include a number of hook and ladder systems or magnets arranged in a circular, rectangular or other similar geometrical pattern that would allow the portions to be secured to each other in a number of angled positions. This is beneficial so that when two gadgets have to be quick put together so that they can be stored quickly in a bag and take out together later, the user doesn't have to spend time aligning the two protective covers 2 so that the edges line up perfectly.

Figure 4:
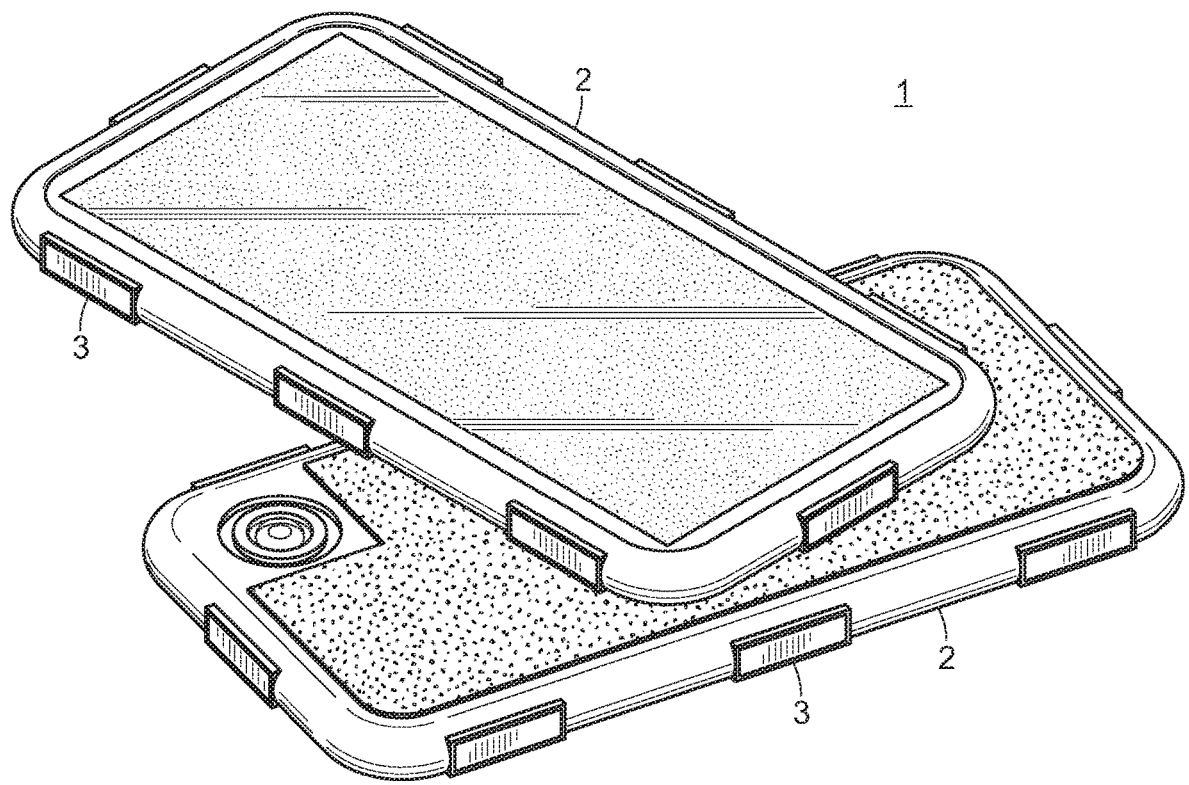
FIG. 4 shows the electronic devices back to back swiveled respect to each other's orientation.

FIG. 4 shows the case assembly 1 with the protective covers 2 rotated with respect to each other but still with the backs attached. The side attachment means 3 is not acting in a position where the assembly portions are turned with respect to each other.

Figure 5:
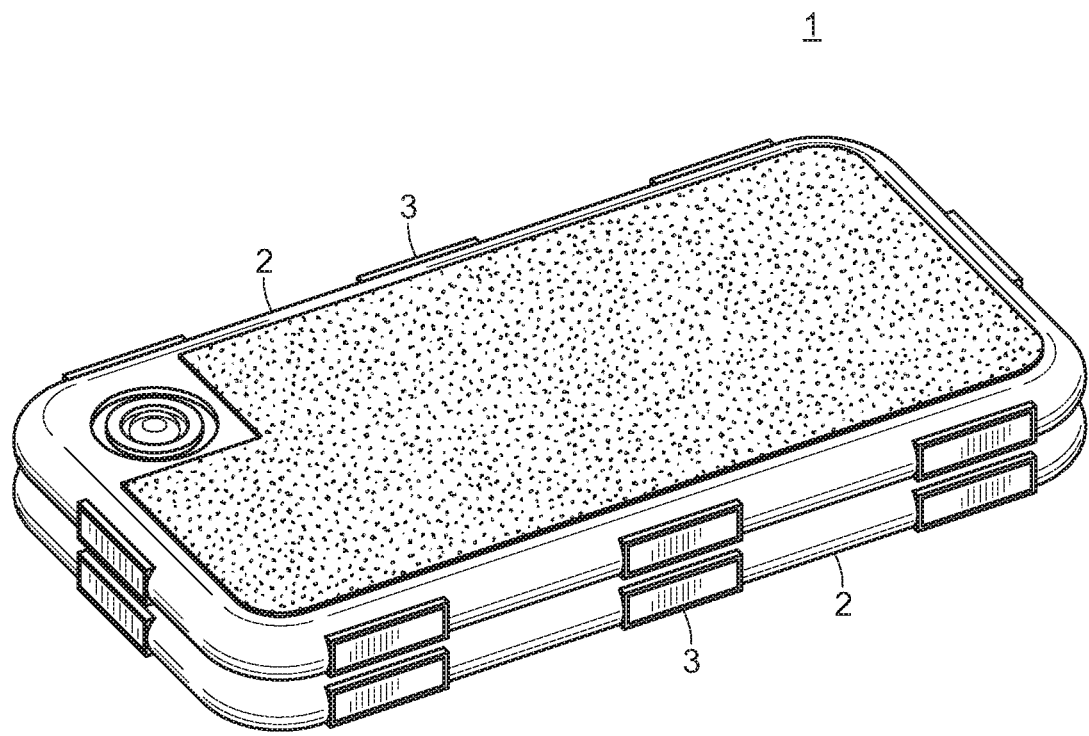
FIG. 5 shows a top perspective with the electronic devices face to face swiveled about 180 degrees with respect to each other's orientation.

FIG. 5 shows the case assembly 1 with the protective cover 2 rotated further such that the position of one of the protective covers 2 is rotated by 180 degrees with respect to the second protective cover 2. In this configuration the side attachment 3 means are once again engaged. The user can rotate the two protective covers 2 all the way around, another 180 degrees from the position displayed in FIG. 5.

Figure 6:
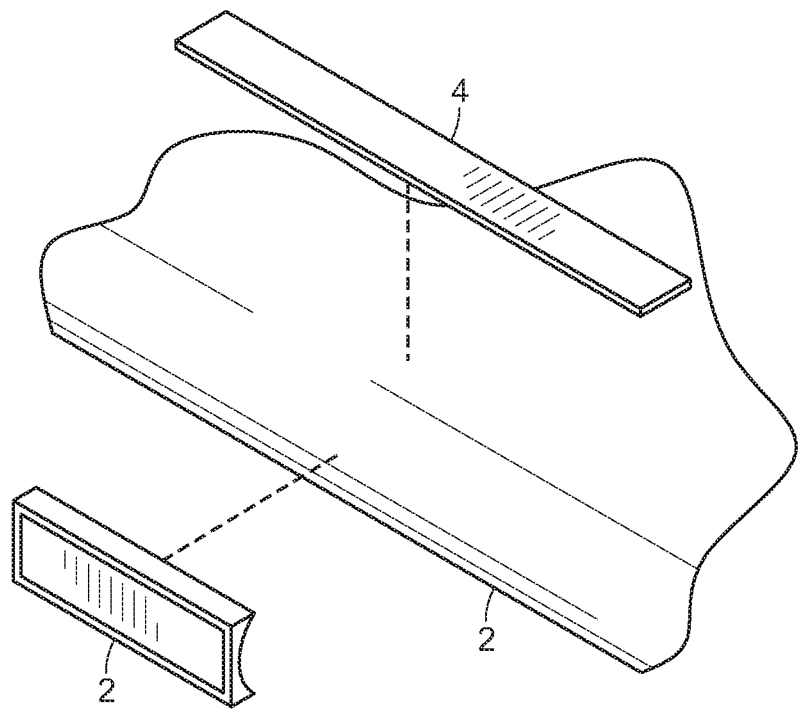
FIG. 6 shows the attachment components separate from the case assembly.

FIG. 6 shows the side 3 and rear attachment 4 mechanisms separate from the case assembly 1. The attachment mechanisms 3, 4 can be integrated into the fabric and material of the protective covers 2 during the production process or be part of a stand-alone kit that is attached to the case assembly portions at a later time by the user. The kit can be glued, sewed, stickered, or attached in any other manner to the case assembly.

Figure 8A:
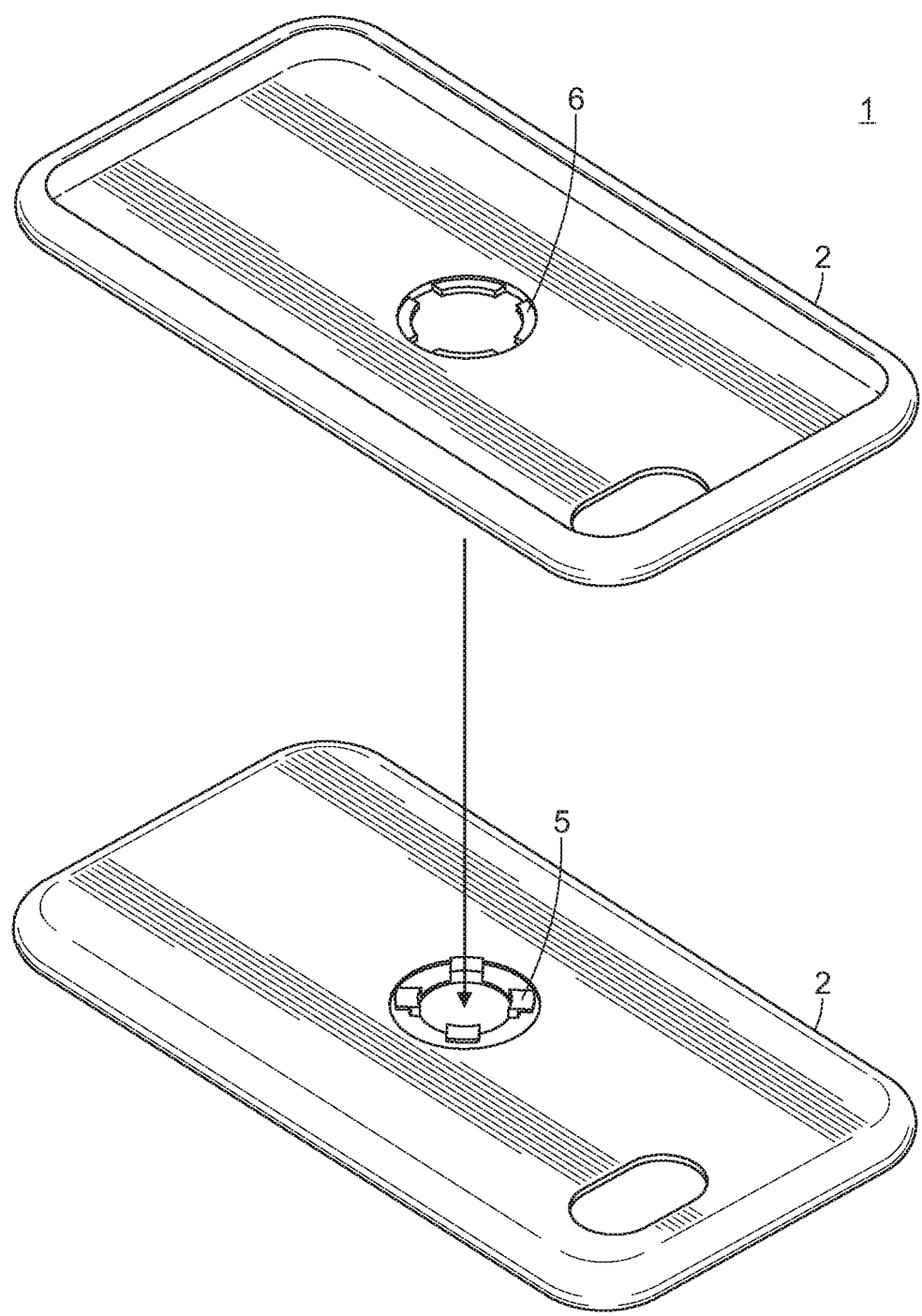
FIG. 8a shows an embodiment of the invention with a male and female attachment.
Figure 8B:
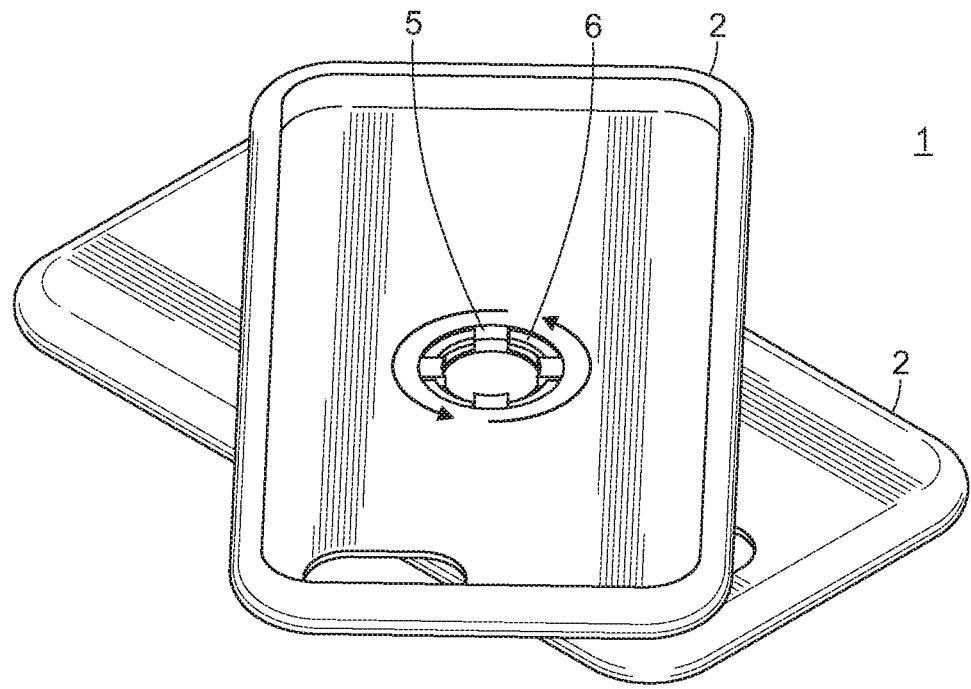
FIG. 8b shows an embodiment of the invention with a male and female attachment connected and in an unlocked position.
Figure 8C:
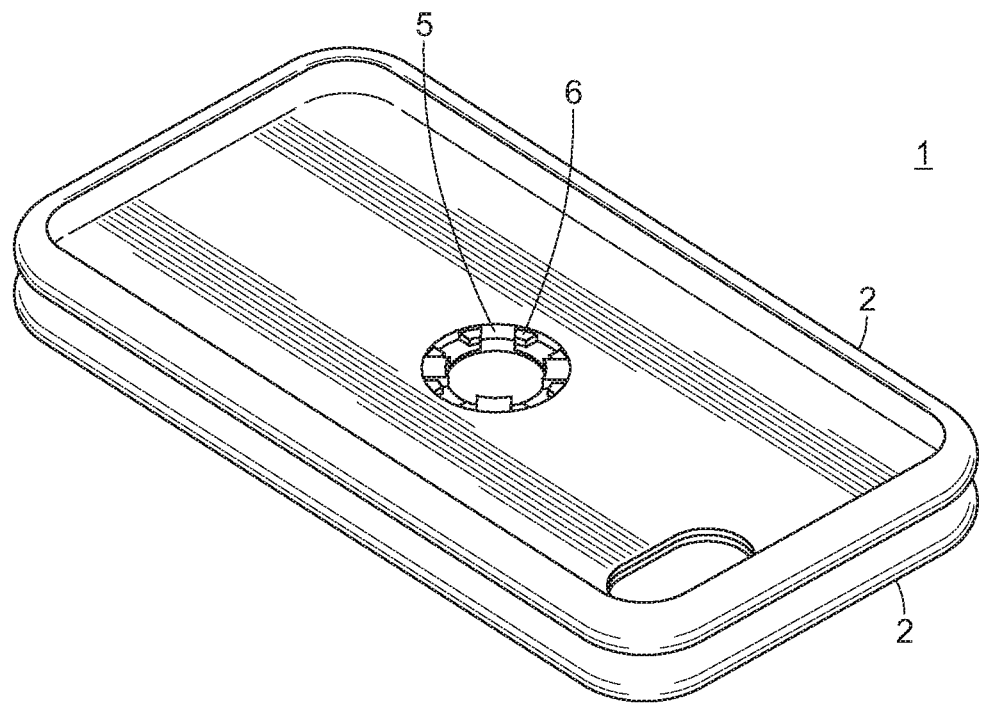
FIG. 8*c* shows an embodiment of the invention with a male and female attachment connected and in a locked position.
Figure 8D:
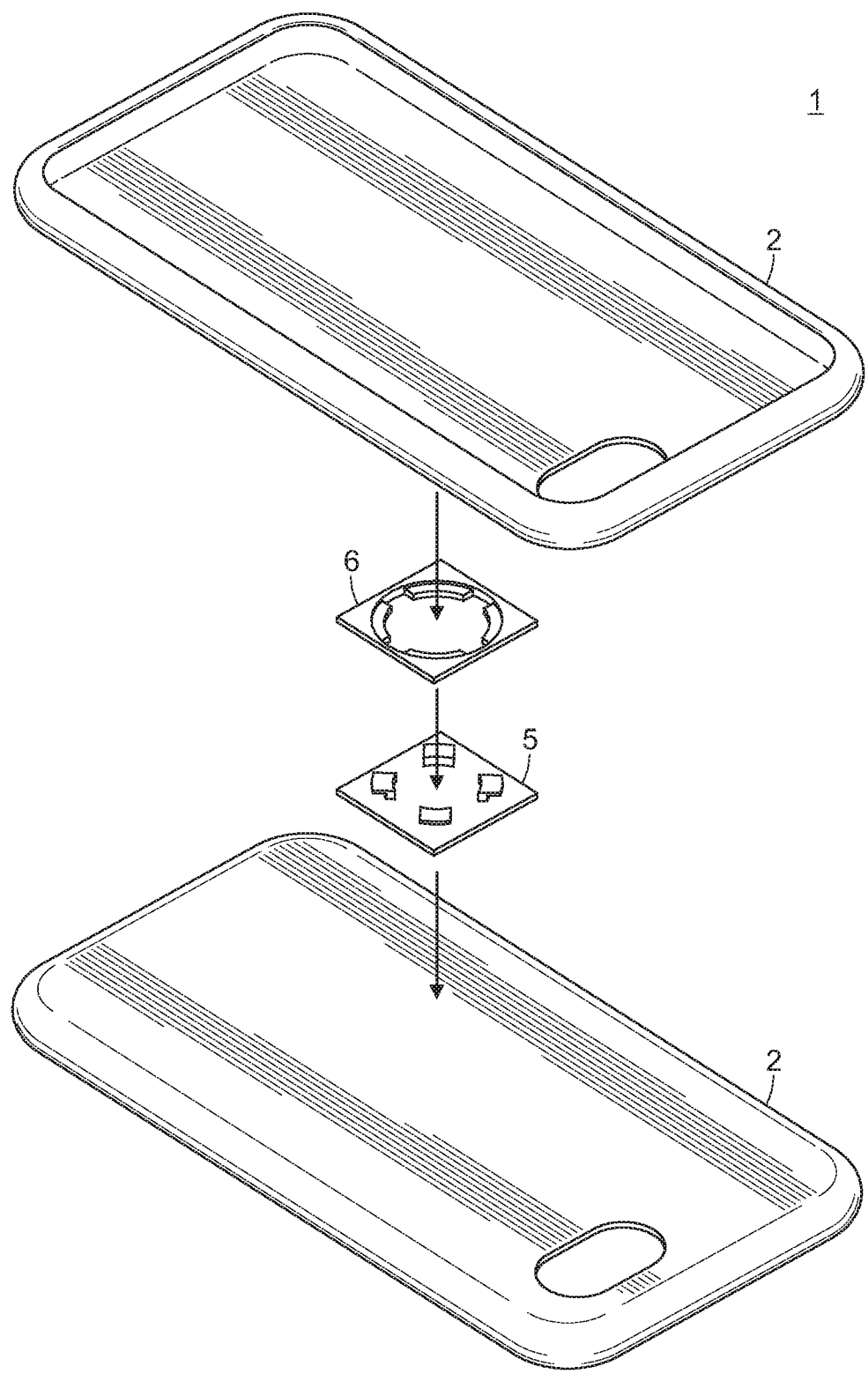
FIG. 8*d* shows an embodiment of the invention with the female and male attachments separate from the cases.
Figure 9:
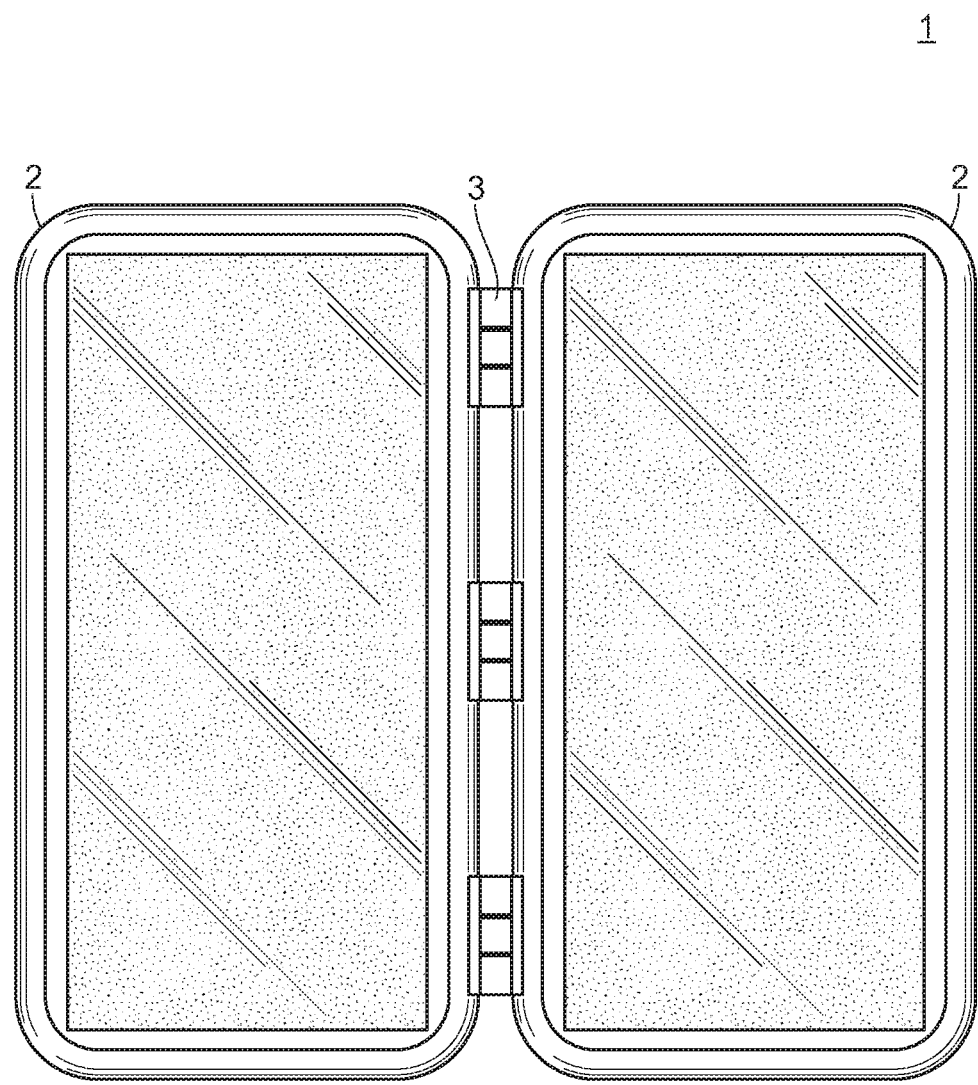
FIG. 9 shows an embodiment of the invention with a hinged side attachment.

FIGS. 8*a*-8*c* show another embodiment of the back attachment mechanism 4. The back attachment mechanism includes a snap fit, wherein a male gear shaped section 5 on a first protective cover 2 connects to a corresponding female section 6 on the second protective cover 2. The male section 5 can join with the female section 6, when the two protective covers 2 are offset from each other as shown in FIG. 8*b*. FIG. 8*c* shows the locked position, wherein the two protective covers 2 are turned to be coaxial, the male 5 section is blocked from being separated from the female section 6. One of the protective covers 2 can then be turned any up to 90 degrees in either direction with respect to the other protective cover 2 in order to place the protective covers in a position where they can be taken apart.

The protective covers 2 can be made of any number materials that would be suitable in protecting the devices from impact, dust, dirt, water, or other hazards. Materials can include any wood, plastic, metal, combination of them, Plastics can include any polyethylene terephthalate (PET), polyethylene (PE), high-density polyethylene, polyvinyl chloride (PVC), polyvinylidene chloride (PVDC), low-density polyethylene (LIVE), polypropylene (PP), polystyrene (PS), high impact polystyrene (HIPS) and polycarbonate (PC), or any combination thereof.

The protective covers 2 can also integrate additions of power transfer elements between existing devices. The protective covers 2 can also include adapters for wired and/or wireless charging capabilities Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A protective case for an electronics device comprising:
   a pair of protective covers configured to enclose the electronics device, each of the pair of protective covers having a front, a back, a first side, a second side, a top and a bottom,
      wherein each of the pair of protective covers comprises at least two side attachment mechanisms configured to attach to another side attachment mechanism on the other of the pair of protective covers,
   wherein the back of a first protective cover of the pair of protective covers comprises a first rear attachment mechanism and the back of a second protective cover of the pair of protective covers comprises a second rear attachment mechanism, the first rear attachment mechanism comprising a male component and the second rear attachment mechanism comprising a female component,
      wherein the male component has a plurality of protrusions positioned around a first circular opening,
      wherein the plurality of protrusions protrude outwardly from the first circular opening,
      wherein the female component has a plurality of recesses positioned around a periphery of a second circular opening with each of the plurality of recesses being shaped to receive one of the plurality of protrusions, and
      wherein the male component is configured to be engaged with the female component and rotated about one another, wherein the rotation affixes the pair of protective covers to one another.

2. The protective case of claim 1, wherein the at least two side attachment mechanisms comprise magnets.

3. The protective case of claim 1, wherein the at least two side attachment mechanisms comprise a hook and loop material.

4. The protective case of claim 1, wherein the at least two side attachment mechanisms comprise a hinge.

5. The protective case of claim 1, wherein the pair of protective covers are able to rotate past each other 180 degrees.

6. The protective case of claim 1, wherein each of the pair of protective covers are different sizes.

7. The protective case of claim 1, wherein the protective covers are made of a material comprising polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

8. The protective case of claim 1, wherein the rear attachment mechanism is separable from the protective cover.

* * * * *